Sept. 16, 1930.     R. F. WEDGE     1,775,838
PLANT PACKAGE AND PROCESS OF MAKING
Filed Feb. 11, 1928
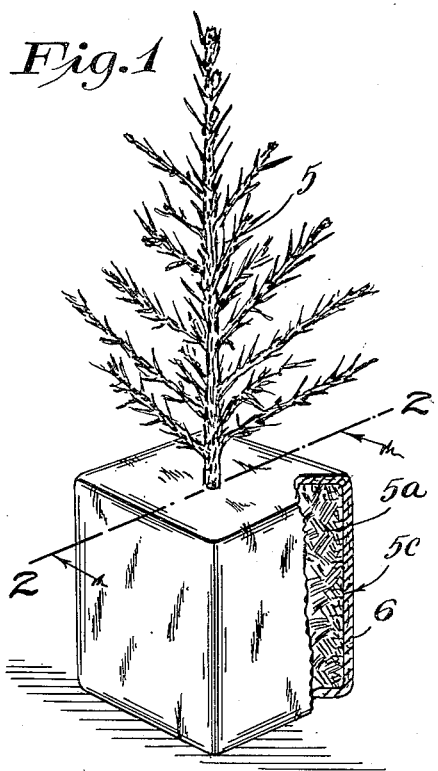
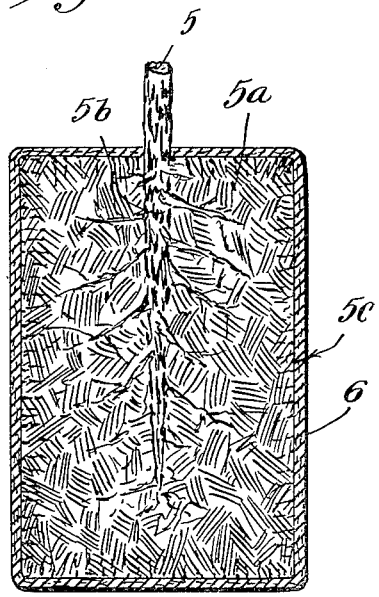
Inventor
Ralph F. Wedge
By his Attorneys Patented Sept. 16, 1930

1,775,838

UNITED STATES PATENT OFFICE

RALPH F. WEDGE, OF ALBERT LEA, MINNESOTA

PLANT PACKAGE AND PROCESS OF MAKING

Application filed February 11, 1928. Serial No. 253,607.

This invention relates to a coated plant package and method of producing the same. As is well known, plants such as young trees are now marketed in large numbers and these plants are lifted from the ground at the nurseries and transported to various places for sale and subsequent replanting. It is the most common method to handle and transport such young trees and plants with the roots substantially free from dirt.

It is very desirable to have a plant package in which some material is held about the roots of the plant, not only to protect the roots, but to hold moisture so that the roots will not dry out excessively and so that some growth of the plant may continue while it is being transported. It is also desirable to have a plant package with such material about the roots so held in place, that the plant can be transported and displayed for sale without the material about the roots being disintegrated and separated from the roots.

It is an object of this invention, therefore, to provide a plant package having a ball or block of material about the roots thereof which block is provided with a coating more or less waterproof.

It is also an object of the invention to provide a method of forming a plant package which consists in forming a block or ball of material about the roots of the plant and then dipping said ball or block of material into heated or boiling asphalt or other material adapted to harden whereby a coating is formed on said block or ball which will subsequently harden.

It is more specifically an object of the invention to produce a plant package comprising a block or ball of fibrous material such as peat placed about the roots and stem of the plant, said block or ball then being dipped in liquid or boiling asphalt or other material, so that a coating adheres to the same, which coating subsequently hardens.

These and other objects and advantages of the invention will be fully set forth in the following description made in connection with the accompanying drawings, in which like reference characters refer to similar parts throughout the several views and in which:—

Fig. 1 is a perspective view of a plant package formed in accordance with the present invention, a part thereof being broken away and other portions being shown in vertical section; and, Fig. 2 is a section through the lower portion of the plant and package, said section being taken substantially on line 2—2 of Fig. 1, as indicated by the arrow.

In accordance with the present invention, a plant 5 is taken and some material $5^a$ is placed about the roots and lower portion $5^b$ of the stem thereof, or some material is left about the roots and stem when the plant is lifted from the ground. This material is then formed into the desired shape. The material about the roots may be the earth in which the plant was growing, may be clay, or the same may be of a more fibrous nature. If desired, raw peat may be placed about the roots and pressed into the desired shape. When the material has been so placed and formed, a body of material $5^c$ of definite shape is attached to the plant. After the body of material is thus formed about the plant, the same is dipped into heated liquid such as asphalt, which may be at the boiling point when the body is dipped therein. When the body is so dipped in the asphalt, a layer of the asphalt adheres thereto, the latter penetrating somewhat into said body and after the body of material is withdrawn, said layer hardens. A coating 6 of asphalt or other similar bituminous material is thus formed about the body of the material on the plant, extending entirely around said body from the stem of the plant. This coating is quite thin and on a small plant the coating will be approximately 1/16th of an inch in thickness. After the body of material is thus formed about the plant and the coating applied thereto, a plant package is formed, which can be readily transported and handled for sale, without any of the material about the roots of the plant being knocked loose or dropping off. The coating is substantially waterproof, and effectively prevents the evaporation of moisture from the body of material about the plant so that the roots and stem of the plant will not dry excessively, the growth of the plant will not be entirely stopped, and the plant will appear in fresh and green condition, while it is being offered for sale. The plant will also readily start growth when against replanted. When the plant is replanted, the coating will be removed from the body of the material on the plant. The coating can be easily and quickly peeled off from the material about the plant. The coating being waterproof, the structure is more desirable for handling in stores and being sold over the counter, as it will not readily absorb water and disintegrate. The method of dipping the plant to form a coating thereon is also quite inexpensive, and the material and labor cost is much less than where a coating of burlap or other material is placed about the plant. The covering of asphalt or other waterproof material is also of small weight and the package weighs a great deal less than a package which has been potted in the ordinary crockery pot. While the asphalt coating hardens to a great extent, it remains soft and pliable and does not become brittle. The packages therefore, will stand considerable jamming and pressure without any danger of the coating being disrupted or fractured, as the same merely gives more or less to the pressure of other objects.

While it is at the present time considered preferable to have the body of material about the roots of the plant dipped in the heated coating material, it will be apparent that the coating can also be applied by spraying or being painted on the body of material. The purpose of the invention broadly is to provide a coating about the material on the plant which may be waterproof and is adapted to harden. The coating can also be applied to paper, burlap, or other sheet material wrapped around the material on the plant so that the edges of the paper or burlap will be held together by the coating and kept in place so that no sewing or tying is necessary. The coating can also be readily applied to material about the roots of plants which have been potted. The material is simply taken from the pot and dipped into the coating solution so that the coating is applied to the material about the roots. This material will have the shape of the pot in which it had been contained. When the package is first removed from the liquid and before the same completely hardens, it is easy to stick a label against the side of the coating so that the label will adhere firmly thereto. The plants can thus be easily and effectively labeled and advertising matter can be easily placed on the package.

From the above description it is seen that applicant has provided a very simple and efficient method of applying a coating about the material surrounding the roots and stem of the plant. The coating is easily, rapidly and inexpensively applied, and as above set forth, is preferably waterproof. The moisture is thus held in the material and the material is protected in the subsequent transportation and handling of the plant. The invention has been amply demonstrated in actual practice and found to be very successful and efficient.

It will, of course, be understood that various changes may be made in the form, details, arrangement and proportions of the product, and in the steps and sequence of steps of the method, without departing from the scope of applicant's invention, which, generally stated, consists in a method and product capable of carrying out the objects above set forth, such as disclosed and defined in the appended claims.

What is claimed is:—

1. The process of producing a coated plant package for a small tree or similar plant, which consists in forming a body of material of definite shape directly about the roots of a plant and then applying a liquid to said body, which liquid is adapted to harden and then subjecting said body to a temperature in which said liquid will harden whereby a continuous coating is formed about said roots.

2. The method of producing a coated plant package for a small tree or similar plant, which consists in forming a quantity of material into a body of definite shape directly about the roots of the plant and then dipping said body into a heated waterproofing liquid adapted subsequently to harden to cause said liquid to adhere to said body and form a waterproof coating thereon, and then subjecting said body to a temperature in which said coating will cool and harden.

3. The method of producing a coated plant package for a small tree or similar plant, which consists in forming a quantity of fibrous material directly about the roots and stem of a plant to form a permanent body of definite shape, then dipping said body into a highly heated bituminous liquid adapted to harden when cooled to form a coating of said liquid about said body, and then subjecting said body to a temperature in which said coating will harden.

4. The process of producing a plant package for a small tree or similar plant, which consists in forming a quantity of raw peat directly about and between the roots and stem of a plant into a body of permanent shape and then dipping said body of peat into boiling asphalt whereby said asphalt adheres to said body and penetrates the same to some degree to form a coating entirely thereabout, said stem only protruding, and then subjecting said body to a temperature in which said coating will harden.

5. A coated plant package comprising a plant, such as a young tree having a quantity of material of definite shape about and in direct contact with the stem and roots thereof, which body of material is provided with a continuous coating of material formed from a liquid adapted to harden.

6. A coated package comprising a plant, such as a young tree having a quantity of fibrous material disposed about and embedding the roots thereof, said quantity forming a body of definite shape and a continuous coating of waterproof material adhering to and surrounding said body, the stem of said body only protruding.

7. A coated plant package comprising a plant, such as a young tree, having a quantity of peat, which has been formed into a body of definite shape directly about the roots thereof so as to embed the same; said body being surrounded with a continuous coating of bituminous material.

8. A coated plant package comprising a plant, such as a young tree, having a quantity of peat compressed about and between the roots and lower portion of the stem thereof to form a body of definite shape, and a continuous coating of waterproof material adhering to and surrounding said body.

9. A coated plant package comprising a plant, such as a young tree, having a quantity of peat disposed about the roots and lower portion of the stem thereof and which has been formed into a body of definite shape so that said roots are embedded therein, which body is surrounded by a continuous coating of asphalt adhering thereto.

10. The process of producing a coated plant package for a young tree or similar plant which consists in forming a quantity of raw peat directly about and between the roots of said plant and into a body of permanent shape and then coating said body over its entire surface with a waterproof coating, the stem only of said plant protruding through said coating.

11. The process of producing a coated plant package which consists in pressing a body of moisture-containing material about the roots of a plant to form said body into a definite shape, then coating said body with a waterproof material over the whole surface of said body so that only the stem of the plant protrudes through said coating.

In testimony whereof I affix my signature.
RALPH F. WEDGE.